United States Patent
Van Phan et al.

(10) Patent No.: US 11,172,522 B2
(45) Date of Patent: Nov. 9, 2021

(54) CONNECTION ESTABLISHMENT

(71) Applicant: Nokia Technologies Oy, Espoo (FI)

(72) Inventors: Vinh Van Phan, Oulu (FI); Ling Yu, Kauniainen (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 17/268,720

(22) PCT Filed: Sep. 24, 2019

(86) PCT No.: PCT/FI2019/050683
§ 371 (c)(1),
(2) Date: Feb. 16, 2021

(87) PCT Pub. No.: WO2020/070380
PCT Pub. Date: Apr. 9, 2020

(65) Prior Publication Data
US 2021/0251023 A1      Aug. 12, 2021

Related U.S. Application Data

(60) Provisional application No. 62/741,640, filed on Oct. 5, 2018.

(51) Int. Cl.
| | | |
|---|---|---|
| *H04W 76/10* | (2018.01) | |
| *H04W 4/40* | (2018.01) | |
| *H04W 76/40* | (2018.01) | |
| *H04W 72/04* | (2009.01) | |
| *H04W 76/14* | (2018.01) | |
| *H04W 92/18* | (2009.01) | |

(52) U.S. Cl.
CPC ............ *H04W 76/10* (2018.02); *H04W 4/40* (2018.02); *H04W 72/04* (2013.01); *H04W 76/14* (2018.02); *H04W 76/40* (2018.02); *H04W 92/18* (2013.01)

(58) Field of Classification Search
CPC .... H04W 76/14; H04W 92/18; H04W 72/048
See application file for complete search history.

(56) References Cited

U.S. PATENT DOCUMENTS

| | | |
|---|---|---|
| 2015/0327288 A1 | 11/2015 | Park |
| 2016/0295624 A1 | 10/2016 | Novlan et al. |

(Continued)

OTHER PUBLICATIONS

"New SID: Study on NR V2X", 3GPP TSG RAN Meeting #80, RP-181429, Agenda: 9.1.5, Vodafone, Jun. 11-14, 2018, 5 pages.

(Continued)

*Primary Examiner* — Raj Jain
(74) *Attorney, Agent, or Firm* — Nokia Technologies Oy

(57) ABSTRACT

There is provided a method at a first user equipment, the method comprising: deciding to set up a unicast sidelink, SL, connection with a second user equipment; determining whether or not a radio access network serving the first user equipment or a radio access network serving the second user equipment is able to assist in setting up the unicast SL connection; performing one of the following: upon determining the positive, applying a L1 unicast-based SL connection for setting up the unicast SL connection, upon determining the negative, applying a L1 broadcast-based SL connection for setting up the unicast SL connection; and communicating with the second user equipment over the unicast SL.

20 Claims, 6 Drawing Sheets

(56) References Cited

U.S. PATENT DOCUMENTS

| | | | |
|---|---|---|---|
| 2016/0323777 A1* | 11/2016 | Pan | H04B 7/14 |
| 2017/0055280 A1 | 2/2017 | Kim et al. | |
| 2017/0164381 A1 | 6/2017 | Kim et al. | |
| 2018/0098369 A1 | 4/2018 | Yasukawa et al. | |
| 2018/0242190 A1* | 8/2018 | Khoryaev | H04L 47/283 |
| 2020/0178221 A1* | 6/2020 | Byun | H04W 72/12 |
| 2020/0337096 A1* | 10/2020 | Zhang | H04W 76/11 |

OTHER PUBLICATIONS

"LS on Support of Unicast, Groupcast, and Broadcast", 3GPP TSG RAN WG1 Meeting #94, R1-1809907, RAN WG1, Aug. 20-24, 2018, 1 page.

International Search Report and Written Opinion received for corresponding Patent Cooperation Treaty Application No. PCT/FI2019/050683, dated Dec. 13, 2019, 14 pages.

"3rd Generation Partnership Project; Technical Specification Group Radio Access Network; Vehicle to Vehicle (V2V) services based on LTE sidelink; User Equipment (UE) radio transmission and reception (Release 14)", 3GPP TR 36.785 V14.0.0, Oct. 2016, pp. 1-57.

"3rd Generation Partnership Project; Technical Specification Group Radio Access Network; Evolved Universal Terrestrial Radio Access (E-UTRA); Services provided by the physical layer (Release 15)", 3GPP TS 36.302 V15.0.0, Jun. 2018, pp. 1-30.

* cited by examiner

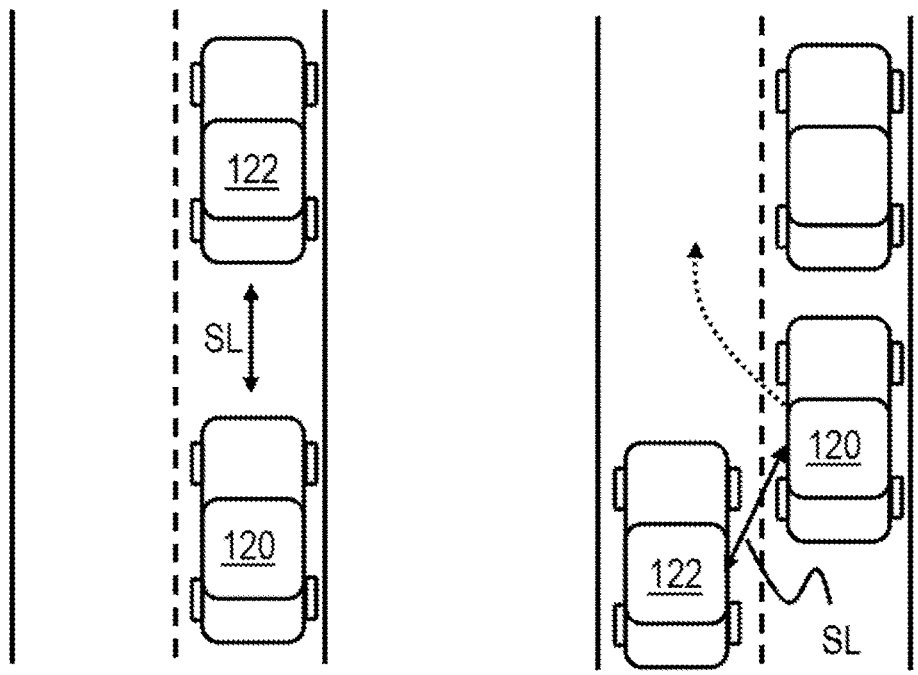
FIG. 2A
FIG. 2B
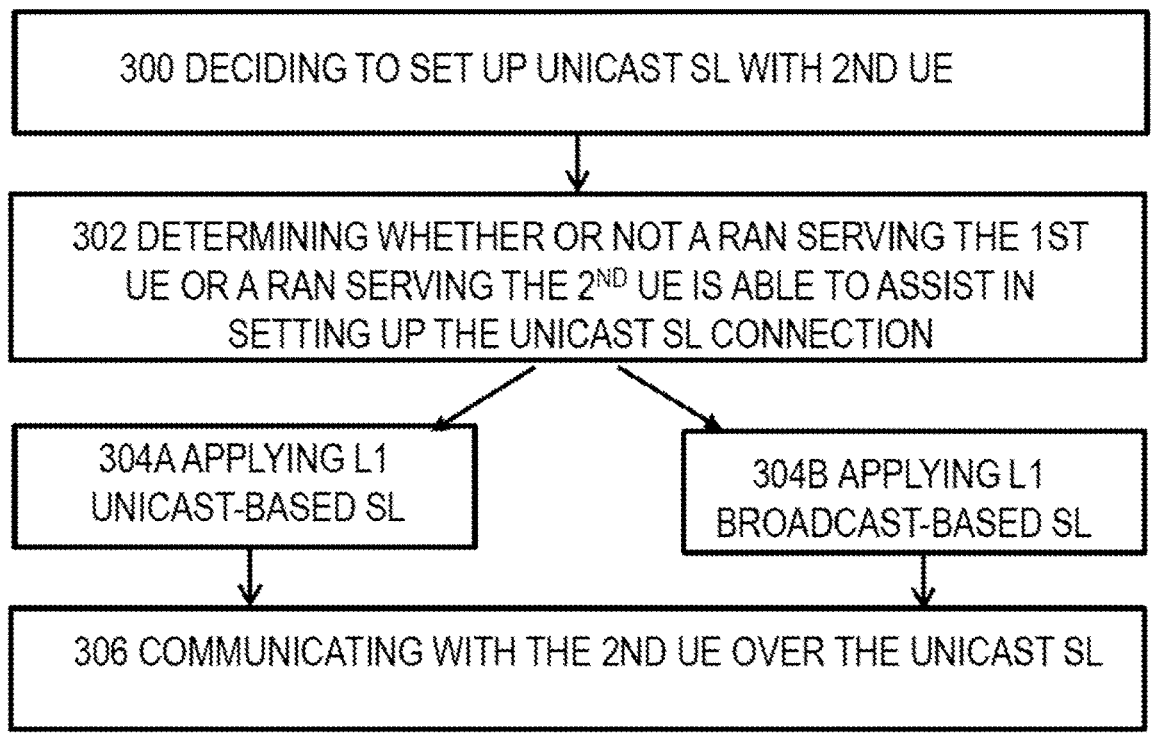
FIG. 3

CONNECTION ESTABLISHMENT

RELATED APPLICATION

This application was originally filed as a Patent Cooperation Treaty Application No. PCT/FI2019/050683 filed on Sep. 24, 2019, which claims priority from U.S. Provisional Patent Application No. 62/741,640 filed on Oct. 5, 2018, which is hereby incorporated in its entirety.

TECHNICAL FIELD

Various example embodiments relate generally to connection establishment, e.g. between mobile or vehicular devices.

BACKGROUND

It is important to set up a connection between two devices reliably. Also, in some cases, it may be important to set up the connection fast. This may be the case with applications requiring ultra-reliable low latency communications (URLLC). One use case where such use cases are present is vehicular communications.

SUMMARY

According to some aspects, there is provided the subject matter of the independent claims. Some further aspects are defined in the dependent claims.

LIST OF THE DRAWINGS

In the following, the invention will be described in greater detail with reference to the embodiments and the accompanying drawings, in which FIG. 1A presents a communication network, according to some embodiments;

FIG. 1B presents a communication network, according to some embodiments;

FIG. 2A shows a use case to which the embodiments may be applicable to;

FIG. 2B shows a use case to which the embodiments may be applicable to;

FIG. 3 shows a method, according to an embodiment;

DESCRIPTION OF EMBODIMENTS

Figure 1A:
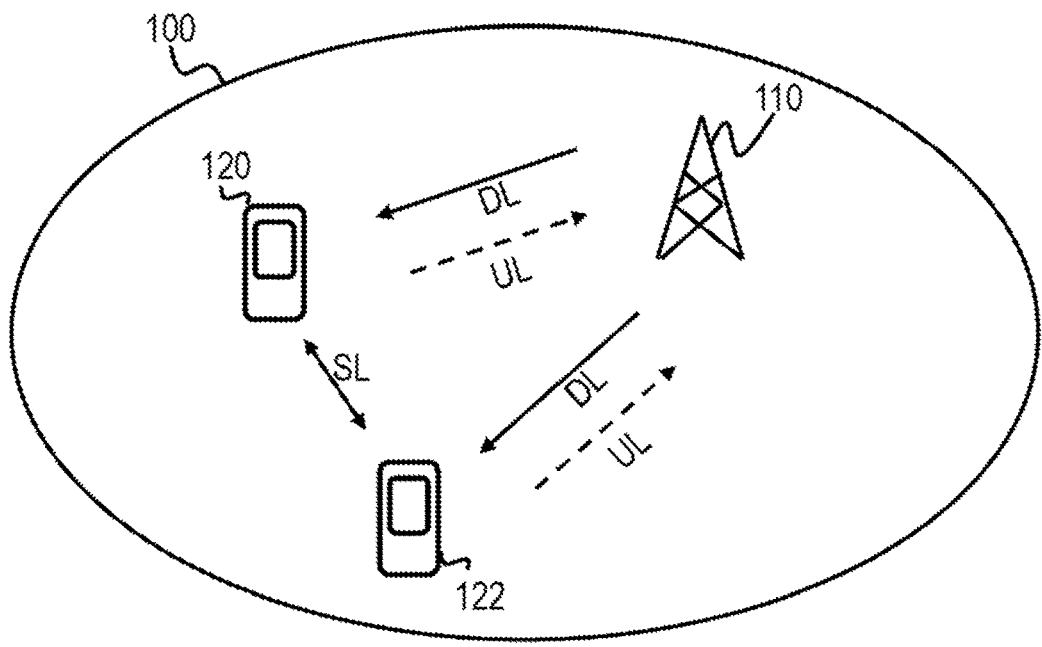

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as one comprising at least one of the following radio access technologies (RATs): Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (WCDMA), high-speed packet access (HSPA), Long Term Evolution (LTE), LTE-Advanced, and enhanced LTE (eLTE), wireless local area network (WLAN or WiFi), Bluetooth®, personal communications services (PCS), ZigBee®, systems using ultra-wideband (UWB) technology, sensor networks, mobile ad-hoc networks (MANETs) and Internet Protocol multimedia subsystems (IMS) or any combination thereof. Term 'eLTE' here denotes the LTE evolution that connects to a 5G core. LTE is also known as evolved UMTS terrestrial radio access (EUTRA) or as evolved UMTS terrestrial radio access network (EUTRAN).

The embodiments are not, however, restricted to the systems/RATs given as an example but a person skilled in the art may apply the solution to other communication systems provided with necessary properties. One example of a suitable communications system is the 5G system. The 3GPP solution to 5G is referred to as New Radio (NR). 5G has been envisaged to use multiple-input-multiple-output (MIMO) multi-antenna transmission techniques, more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology/radio access network (RAT/RAN), each optimized for certain use cases and/or spectrum. 5G mobile communications may have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and being integradable with existing legacy radio access technologies, such as the LTE.

The current architecture in LTE networks is distributed in the radio and centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications). Edge cloud may be brought into RAN by utilizing network function virtualization (NVF) and software defined networking (SDN). Using edge cloud may mean access node operations to be carried out, at least partly, in a server, host or node operationally coupled to a remote radio head or base station comprising radio parts. Network slicing allows multiple virtual networks to be created on top of a common shared physical infrastructure. The virtual networks are then customised to meet the specific needs of applications, services, devices, customers or operators.

For 5G networks, it is envisaged that the architecture may be based on a so-called CU-DU (central unit—distributed unit) split, where one gNB-CU controls several gNB-DUs. The term 'gNB' may correspond in 5G to the eNB in LTE. The gNBs (one or more) may communicate with one or more UEs. The gNB-CU (central node) may control a plurality of spatially separated gNB-DUs, acting at least as transmit/receive (Tx/Rx) nodes. In some embodiments, however, the gNB-DUs (also called DU) may comprise e.g. a radio link control (RLC), medium access control (MAC) layer and a physical (PHY) layer, whereas the gNB-CU (also called a CU) may comprise the layers above RLC layer, such as a packet data convergence protocol (PDCP) layer, a radio resource control (RRC) and an internet protocol (IP) layers. Other functional splits are possible too. It is considered that skilled person is familiar with the OSI model and the functionalities within each layer.

The plurality of gNBs (access points/nodes), each comprising the CU and one or more DUs, may be connected to each other via the Xn interface over which the gNBs may negotiate. The gNBs may also be connected over next generation (NG) interfaces to a 5G core network (5GC), which may be a 5G equivalent for the core network of LTE. Such 5G CU-DU split architecture may be implemented using cloud/server so that the CU having higher layers locates in the cloud and the DU is closer to or comprises actual radio and antenna unit. There are similar plans ongoing for LTE/LTE-A/eLTE as well. When both eLTE and 5G will use similar architecture in a same cloud hardware (HW), the next step may be to combine software (SW) so that one common SW controls both radio access networks/technologies (RAN/RAT). This may allow then new ways to control radio resources of both RANs. Furthermore, it may be possible to have configurations where the full protocol stack is controlled by the same HW and handled by the same radio unit as the CU.

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

The embodiments may be also applicable to narrow-band (NB) Internet-of-things (IoT) systems which may enable a wide range of devices and services to be connected using cellular telecommunications bands. NB-IoT is a narrowband radio technology designed for the Internet of Things (IoT) and is one of technologies standardized by the 3rd Generation Partnership Project (3GPP). Other 3GPP IoT technologies also suitable to implement the embodiments include machine type communication (MTC) and eMTC (enhanced Machine-Type Communication). NB-IoT focuses specifically on low cost, long battery life, and enabling a large number of connected devices. The NB-IoT technology is deployed "in-band" in spectrum allocated to Long Term Evolution (LTE)—using resource blocks within a normal LTE carrier, or in the unused resource blocks within a LTE carrier's guard-band—or "standalone" for deployments in dedicated spectrum.

Direct mobile device-to-device (D2D) communications, or D2D for short in the following, can also be setup between communication devices. It is noted that direct communications between devices can be referred to in various terms, for example as mobile-to-mobile (M2M), machine-to-machine (M2M), terminal-to-terminal (T2T) or peer-to-peer (P2P). Let us in the following refer to such communication with term D2D. D2D communications can use licensed radio spectrum under supervision and control of at least one supporting system, typically a cellular system but other type of supporting systems are possible too, such as wireless local area network (WLAN/WiFi). D2D may use, at least for a part of the needed resources, the same radio resources of the supporting system or systems. Direct D2D communications can be incorporated into the cellular network for example to reduce transmitter power consumption in the participating communication devices and the network side, to improve spectrum efficiency, to increase cellular network capacity and coverage, and to create and support more services for users in an efficient fashion. The resources may be common resources shared by many devices or dedicated resources allocated to the pair of devices participating the D2D communication by a radio access network (RAN) as the supporting system.

Figure 1B:
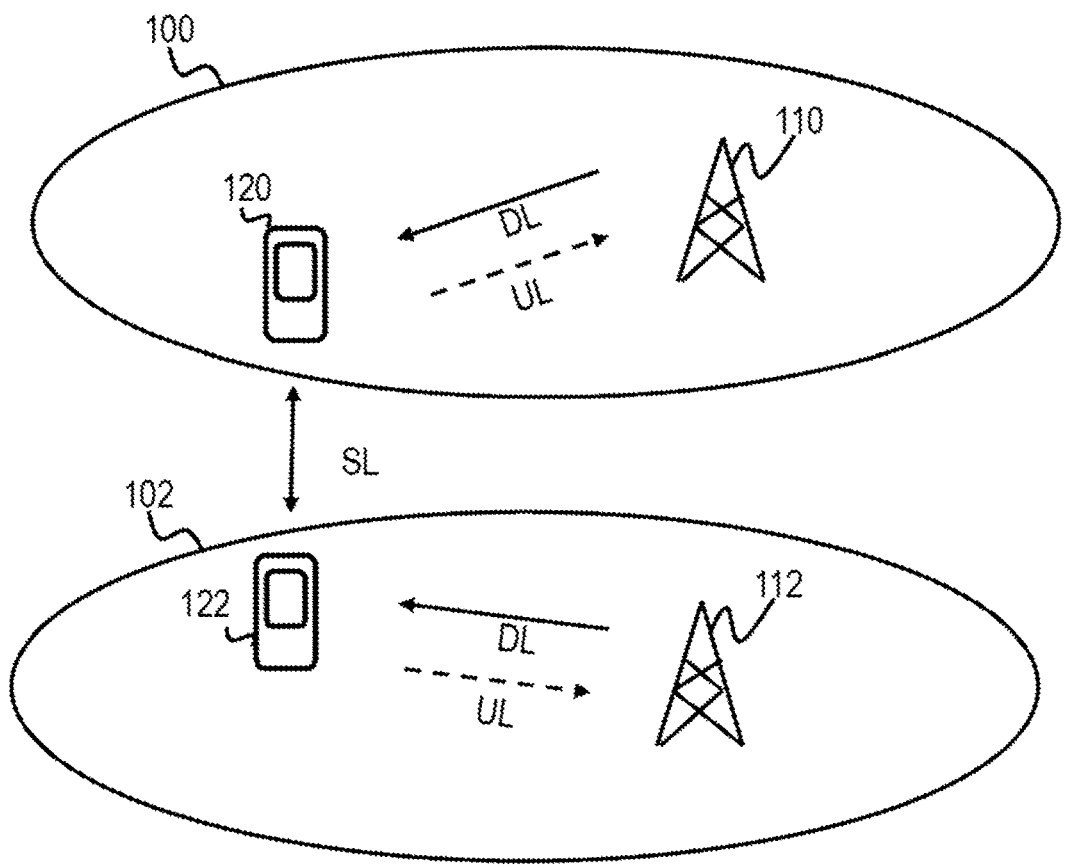

FIGS. 1A and 1B illustrate examples of communication systems to which embodiments of the invention may be applied. Let us look at FIG. 1A. The system may comprise a control node 110 providing a cell 100. Each cell may be, e.g., a macro cell, a micro cell, femto, or a pico cell, for example. In another point of view, the cell may define a coverage area or a service area of the access node 110. The control node 110 may be an evolved Node B (eNB) as in the LTE and LTE-A, ng-eNB as in eLTE, gNB of 5G, or any other apparatus capable of controlling radio communication and managing radio resources within a cell. For 5G solutions, the implementation may be similar to LTE-A, or e.g. apply virtualized networks. The control node 110 may be called a base station, network node, or an access node.

Although not shown, one or more local area access nodes may be arranged within a control area of a macro cell access node. The local area access node may provide wireless access within a sub-cell that may be comprised within a macro cell. Examples of the sub-cell may include a micro, pico and/or femto cell. Typically, the sub-cell provides a hot spot within a macro cell. The operation of the local area access node may be controlled by an access node under whose control area the sub-cell is provided.

The system may be a cellular communication system composed of a radio access network of access nodes, each controlling a respective cell or cells. The access node 110 may provide user equipment 120 (also called UE, user device, user terminal, terminal device, mobile termination, subscriber unit, mobile station, remote terminal, access terminal, etc.) with wireless access to other networks such as the Internet. The wireless access may comprise downlink (DL) communication from the control node 110 to the UE 120 and uplink (UL) communication from the UE 120 to the control node 110. The UE typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, vehicular device, and multimedia device.

For D2D communications, there may be at least a second UE 122, which may also be served by the control node 110. the second UE 122 may further perform D2D communication with the first UE 120. This connection between the two UEs may be called a sidelink (SL).

In FIG. 1B, the situation may differ in that the UES 120, 122 may be served by different cells 100, 102, and/or by different RATs and/or by different operators, e.g. in case where the control nodes 110, 112 do not belong to same radio access networks/operators.

In the case of multiple access nodes in the communication network, the access nodes may be connected to each other with an interface. LTE specifications call such an interface as X2 interface. In connection of IEEE 802.11 network (i.e. wireless local area network, WLAN, WiFi), a similar interface Xw may be provided between access points. An interface between an eLTE access point and a 5G access point may be called Xn. Other communication methods between the access nodes may also be possible.

The access node 110 may be further connected via another interface to a core network of the cellular communication system. The LTE specifications specify the core network as an evolved packet core (EPC), and the core network may comprise a mobility management entity (MME) and a gateway node. The MME may handle mobility of terminal devices in a tracking area encompassing a plurality of cells and handle signalling connections between the terminal devices and the core network. The gateway node may handle data routing in the core network and to/from the terminal devices. The 5G specifications specify the core network as a 5G core (5GC), and the core network may comprise an access and mobility management entity (AMF) and a gateway node. The AMF may handle mobility of terminal devices in a tracking area encompassing a plurality of cells and handle signalling connections between the terminal devices and the core network. The gateway node may handle data routing in the core network and to/from the terminal devices.

Vehicular communication systems are networks in which vehicles and roadside units are the communicating nodes, providing each other with information, such as safety warnings and traffic information. They can be effective in avoiding accidents and traffic congestion. V2V (vehicle to vehicle) is an automobile technology designed to allow automobiles to "talk" to each other. In this sense, V2V resembles D2D communication. Term V2I (vehicular to infrastructure) allows the vehicular devices to communicate with network, such as with roadside access nodes. I.e. V2I may be seen as a communication model that allows vehicles to share information with the components that support a high-way system. Such components include overhead RFID readers and cameras, traffic lights, lane markers, streetlights, signage and parking meters. V2I communication is typically wireless and bi-directional: data from infrastructure components can be delivered to the vehicle over an ad hoc network and vice versa. Together V2V and V2I may be called V2X.

3GPP NR V2X considers support for advanced use cases including cooperative driving use cases such as cooperative perception (see-through) and cooperative maneuvering (lane-merging/switching). Taking the see-through use case as one example shown in FIG. 2A, the vehicle 120, which is blocked of the sight and experiencing a loss of visibility, may request one or more vehicles 122 in front to provide vision-enhancing and/or see-through video streaming over the SL connection. In this case, the requesting end 120 is the content receiver and the requested end 122 is the content provider. This session may be a short- or a long-living one, depending on road traffic condition and traveling path of involved vehicles. Taking the lane-merging/changing use case shown in FIG. 2B for another example, the vehicle 120 which wants to change the lane need to request and agree with one or more impacted vehicles 122 over SL to make proper room or keep proper distance for the requesting vehicle 120 to change the lane. This session may be a short-living one. The vehicles of FIGS. 2A and 2B may be seen as the UEs of FIG. 1A, as the V2V communication needed in FIGS. 2A and 2B is one embodiment of the general D2D communication established between UEs 120, 122 in FIG. 1A. Likewise, also in the vehicular cases of FIGS. 2A and 2B, the vehicles 120, 122 may be served by different cells and/or RATs and/or by different operators. Therefore, the vehicles of FIGS. 2A and 2B may also be called UEs, terminal devices, etc, and be referred with the same reference numerals as the UEs in FIGS. 1A and 1B.

It has been established that, for such use cases which involve at least two particular vehicles traveling on road in proximity of each other, a high-reliability and low-latency communication (HRLLC) or URLLC sessions are needed. Hence, it is important to enable a quick setup of such a challenging HRLLC communication session for a cooperative driving event which is initiated dynamically on-the-fly between the involved or impacted vehicles' UEs. It is noted that the impacted UEs are rather random, determined on-the-fly along with service availability. The impacted vehicles can be subscribers of different operators, referred to as the multi-operator issue. Furthermore, a support for out-of-coverage operation may need to be considered for V2X. Hence, direct D2D based communications is a preferable option, as opposed to options based on conventional network access via e.g. a roadside network access node.

For providing HRLLC for supporting such advanced V2X use cases addressed herein, a network-assisted layer 1 (L1) unicast-based SL, as opposed to current L1 broadcast-based SL, may be preferable.

The L1 unicast-based SL is referred to as a SL transmission/reception scheme in which L1 scheduling assignment (SA) for the SL transmission is addressed to a locally unique access-stratum (AS) UE identifier (ID) or SL ID of an intended receiver or a group of receivers. This may resemble to that of the network-scheduled transmission/reception using a physical downlink control channel (PDCCH) addressed to unique cell-specific radio network temporary identifiers (RNTIs) of scheduled UEs in LTE, for example. The network may assist in resolving collisions in resources and/or locally unique UE IDs or SL IDs for L1 unicast-based SLs. It is noted that L1 unicast-based SL may support multicast/broadcast as well, using locally unique UE ID or SL ID common to a specific group of receiving UEs or all receiving UEs.

On the other hand, L1 broadcast-based SL is referred to a scheme used in the current LTE in which L1 SA of a SL transmission is: either addressed to all, i.e., there is no UE ID of intended receiver is included in SA; or to all of those UEs which randomly share the same part of the UE ID of intended receiver(s) included in the SA. In the latter case, LTE SL solution is one example, i.e. the UE ID included in SA is the 8 low-significant bits (LSB) of a 24-bits long non-access-stratum (NAS) ID or of an application UE ID of the intended receiver or group of receivers.

In the current LTE V2X, SL is fully broadcast and transmitter-oriented. That is, the transmitter is just broadcasting V2X messages over SL without a need of knowing about any specific receivers. It is further noted that realizing such L1 unicast-based SL for autonomous D2D communications is rather problematic because of difficulty in assigning a locally unique UE ID or SL ID for SA. The alternative of using a globally unique UE ID, such as the NAS ID or the application ID for SA, is not a preferable option due to high signalling overhead as well as security reason.

Hence, how to efficiently establish the L1 unicast-based SL connection whenever seen appropriate remains an unsolved issue to which the embodiments presented herein may address. Therefore, the embodiments consider RAN-level enhancements for speeding up the setup of a SL based communication session for the aforementioned cooperative driving use cases, e.g. when using network-assisted L1 unicast SL and taking into account application awareness of the targeted use cases. In other words, L1 unicast-based SL may be primarily used for facilitating advanced V2X use cases with certain applications, while co-existing with the current L1 broadcast-based SL.

It needs to be noted that in the current LTE Proximity Services (ProSe), SL is of L1 broadcast nature and hence unicast communication over SL can only be supported on higher layer, starting from application layer and stopping at layer 2 (L2). The setup of unicast communication over SL in this case is relied on control protocol above the access stratum and thus does not need RAN-level network assistance. On the other hand, framework of network-assisted D2D communications considers L1 unicast-based D2D. There the setup of L1 unicast-based D2D between two UEs in proximity of one another may be fully controlled by a serving RAN and therefore not involve a SL application control protocol at all. The setup may require extensive RAN-level signalling between the involved UEs and between each of the involved UEs and the serving RAN. Furthermore, the multi-operator issue depicted in FIG. 1B is rather problematic that requires notable coordination between involved networks.

To at least partially tackle these problems, there is proposed a solution for expediting setup of unicast communications over SL, e.g. for predetermined V2X use cases including cooperative driving use cases such as cooperative perception (see-through) and cooperative maneuvering (lane-merging/switching). The solution may comprise e.g. (i) triggers for involved or impacted UEs/vehicles to determine whether the needed unicast D2D connection shall be based on the L1 broadcast-based SL or the L1 unicast-based SL, and (ii) RAN-level signalling enhancements for facilitating and fastening the setup of the needed unicast D2D communication session. The proposed solution may in an embodiment be based on exploring application contexts of targeted use cases coupled with UE contexts of involved UEs 120,122 as well as availability of network assistance from a serving RAN of either of the involved UEs. The most appropriate and suitable SL connection may be e.g. either network-assisted or autonomous and either using L1 unicast-based SL or L1 broadcast-based SL, for the intended on-the-fly session as quick as possible.

FIG. 3 depicts an example method. The method may be performed by a first vehicular apparatus/device, such as the UE/vehicle 120 of FIGS. 2A and/or 2B. This first UE 120 may be the initiator or requesting UE that initiates or requests the setup of the unicast D2D communication session for the needed application.

Accordingly, as shown in FIG. 3, the first vehicle 120 may in step 300 decide to set up a unicast sidelink (SL) connection with a second device, such as with the UE/vehicle 122 of FIGS. 2A and/or 2B.

In step 302, the first device 120 may determine whether or not a RAN serving the first device 120 or a RAN serving the second device 122 is able to assist in setting up the unicast SL connection. The term 'RAN' may here denote the cell in which the relevant device 120 or 122 is located, the operator the relevant device 120 or 122 is subscribed to, or the radio access technology (RAT) the relevant device 120 or 122 is using.

Upon determining the positive in step 302 (i.e. that the RAN serving the first device 120 or the RAN serving the second device 122 is able to assist in setting up the unicast SL connection), the method proceeds to step 304A in which the device 120 applies a L1 unicast-based SL connection for setting up the unicast SL connection. For example, the L1 unicast-based SL connection may be used as the unicast SL connection between the two devices 120 and 122. It is noted that unicast communication using the L1 unicast-based SL may require an RNTI kind of access stratum (AS) identifier so that the identifier can be used on a PHY layer (i.e. on L1) to identify the unicast connection or the receiving UE 120 in the unicast communication.

Upon determining the negative in step 302 (i.e. that the RAN serving the first device 120 or the RAN serving the second device 122 is unable to assist in setting up the unicast SL connection), the method proceeds to step 304B in which the device 120 applies a L1 broadcast-based SL connection for setting up the unicast SL connection. For example, the L1 broadcast-based SL connection may be used as the unicast SL connection between the two devices 120 and 122. Such L1 broadcast connection does not need an RNTI kind of ID on the AS layer. On the contrary, it is using an upper layer identifier, such as L2 destination ID, and the required unicast SL connection may be established via higher layer signaling above AS layer (e.g. NAS signaling). In other words, there may not be any need of connection setup using the L1 broadcast-based SL for mere broadcast communication. However, the required unicast communication using the L1 broadcast-based SL connection may need some setup which may be accomplished on a higher layer than L1, e.g. on medium access layer (MAC). For example, in such L1 broadcast based unicast communication, the L2 destination ID is partially in PHY/L1 control channel and partially in MAC protocol data unit (PDU) header. In this way, the receiving UE cannot identify itself only based on PHY/L1 information but needs to receive the MAC PDU to check MAC PDU header to know whether the received PDU is targeted for it or not. Partially for this reason, L1 unicast-based SL connection may be preferred and used if RAN coverage is present, as indicated in steps 302 and 304A.

However, in lack of network coverage/assistance, the L1 broadcast-based SL may be still be used for setting up the unicast communication partially because the L1 broadcast-based unicast SL does not require RAN to provide the locally unique ID to be used in L1.

As shown, according to steps 302-304 the initiator UE/device 120 determines whether L1 unicast-based SL can be provided and enforced for the needed unicast D2D session. If the serving RAN of the first device 120 is able to provide assistance for facilitating L1 unicast-based SL, then the unicast SL connection is set up based on the L1 unicast-based SL. This may be realised using RAN-level signaling enhancements as discussed later. Else, if the involved UE 122, which responds to the request from the initiator UE 120 for the needed unicast D2D session, can benefit from the serving RAN thereof (i.e. the RAN of the second device 122 is able to provide needed assistance for facilitating L1 unicast-based SL), then step 304A may be entered as well. Also. this determination may be realized using RAN-level signaling enhancements, as discussed later. Else, if neither of the RAN(s) can help, then L1 broadcast-based SL is used.

Therefore, as explained above, the device 120 may set up the unicast SL connection and then, in step 306, communicate with the second device 122 over the unicast SL. This communication may involve data related to the application requiring unicast SL connection, as decided in step 300.

In an embodiment, the deciding of step 300 is based on an application requiring the unicast SL connection, or the type of the application. That is, not all applications are determined to require unicast communication. In one embodiment, an application is determined as requiring the unicast SL connection if the application is triggered by the first device 120 for assistance in at least partly autonomous driving. Autonomous driving is a use case which may require HRLLC and thus unicast communication may be beneficial. As some example applications on this field and requiring unicast communication a see-through application and a line-switching/merging application (both discussed earlier) may be mentioned.

Figure 4:
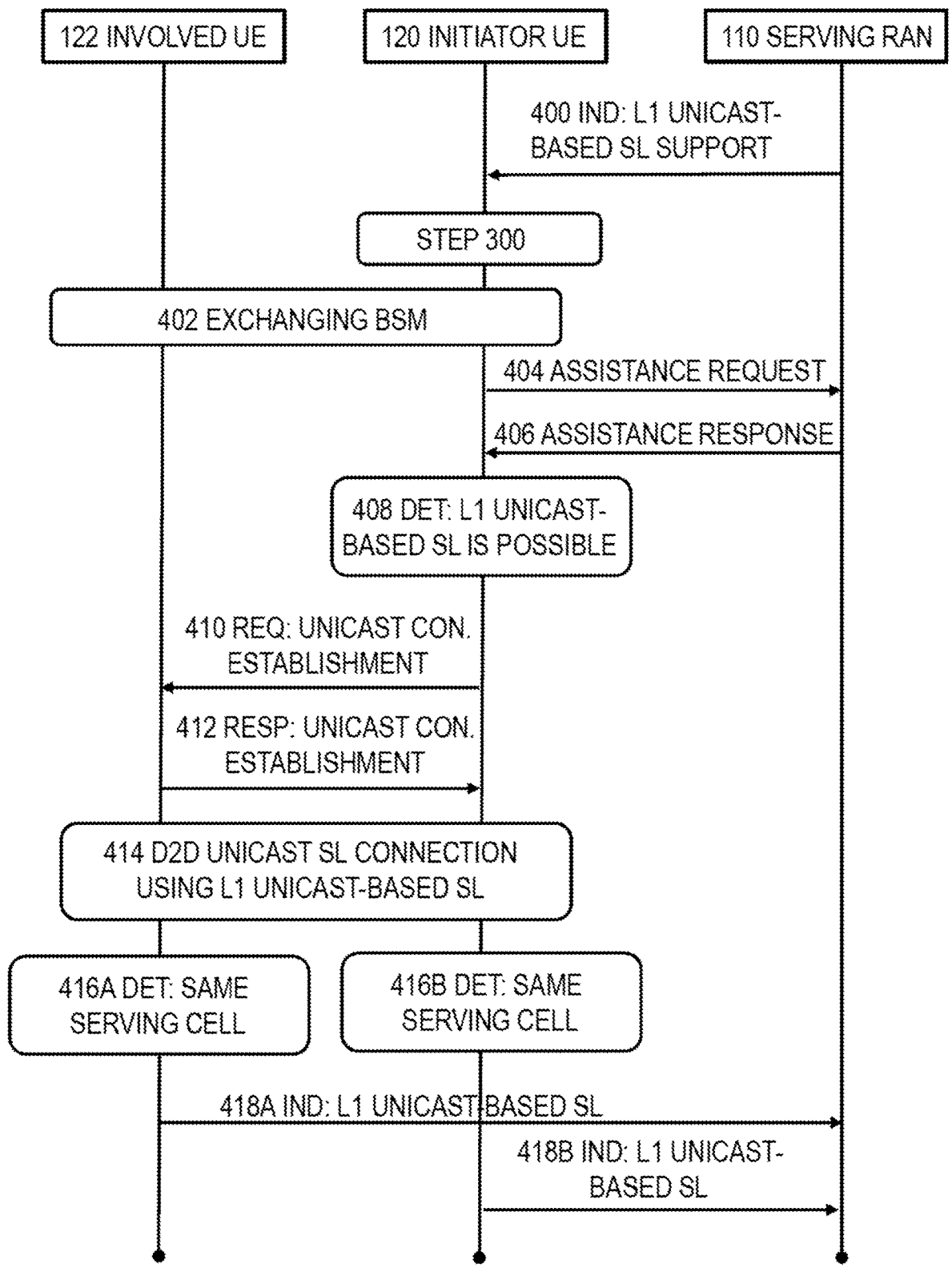
FIG. 4 illustrates a signaling flow diagram, according to some embodiments.
Figure 5:
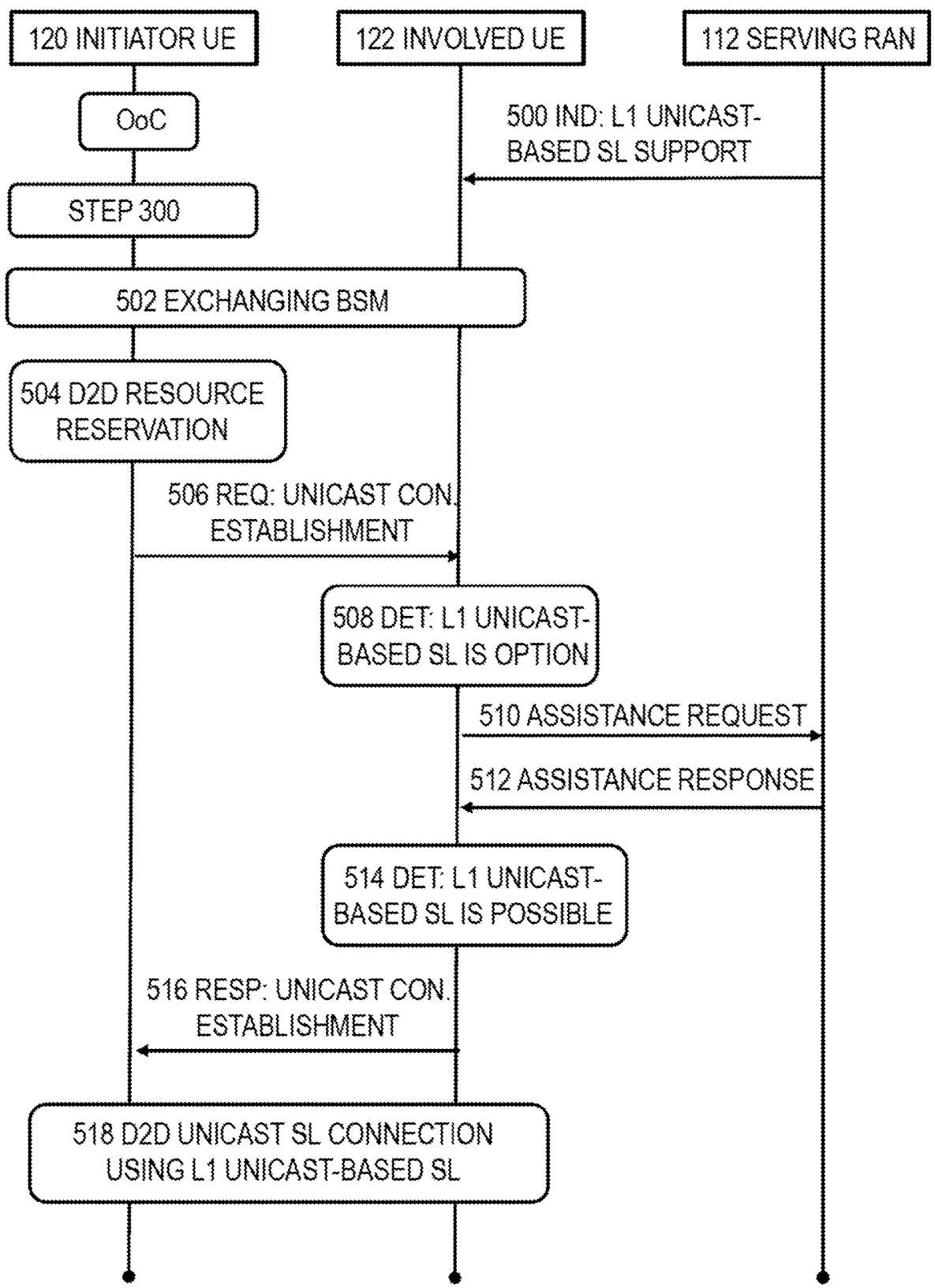
FIG. 5 illustrates a signaling flow diagram, according to some embodiments.
Figure 6:
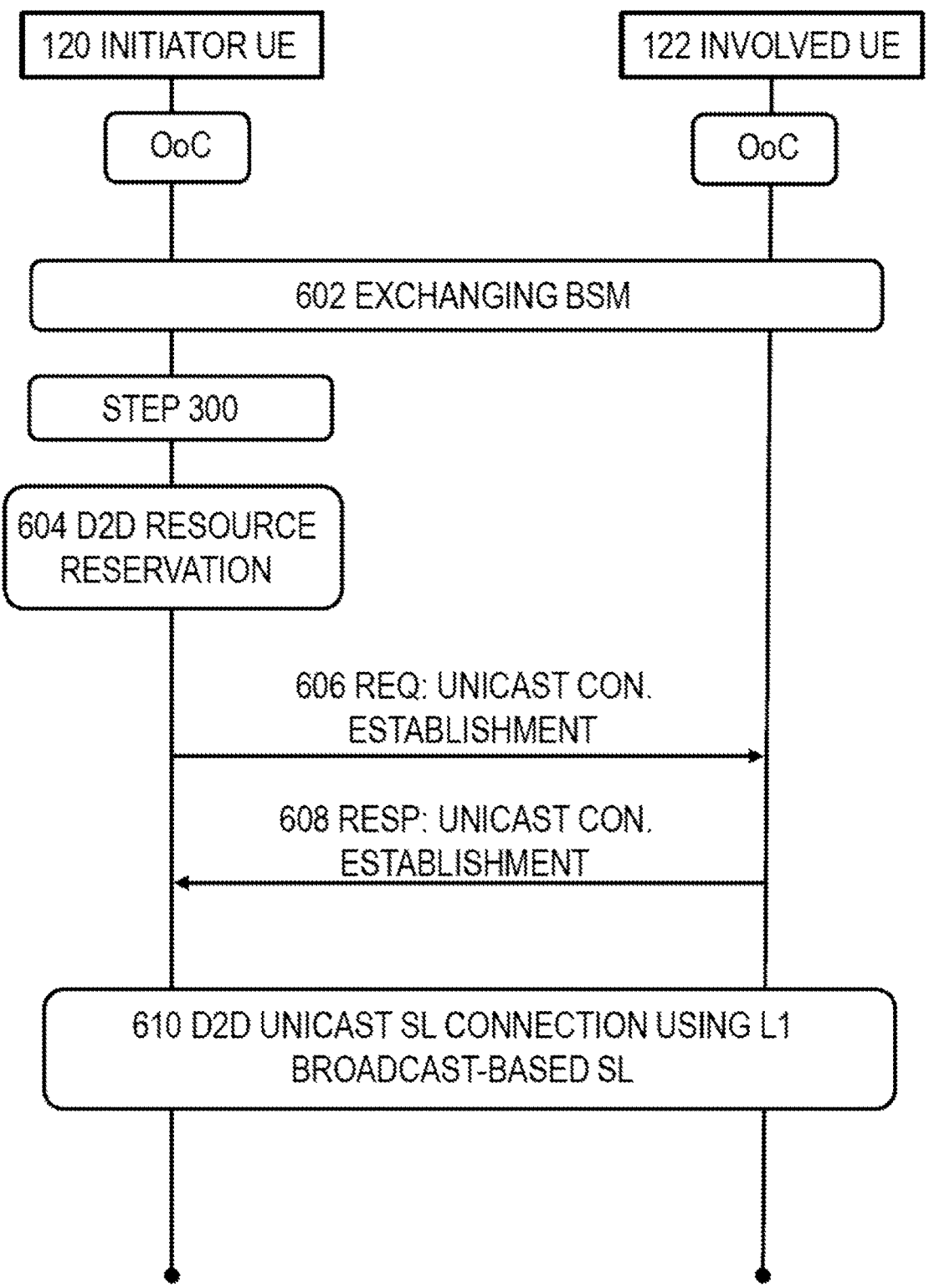
FIG. 6 illustrates a signaling flow diagram, according to some embodiments.

Let us take a closer look on some embodiments with respect to FIGS. 4, 5 and 6. These figures illustrate signalling procedures between the initiator UE 120, an involved UE 122 and a serving gNB (e.g. the gNB 110 or the gNB 112) of the serving RAN over the SL connection between the two UEs 120, 122 and over the Uu connection between the UE 120/122 and respective gNB 110/112, according to some embodiments.

FIG. 4 shows an embodiment for a case where the serving RAN of the initiator UE is able to provide the requested assistance for establishing and using L1 unicast-based SL between the initiator UE and the involved UE. A precondition for this may be that the initiator UE 120 is in RRC-connected state of the serving RAN. In this example embodiment of FIG. 4, both the initiator UE and the involved UE share the same serving RAN (such as the same cell or the same operator).

In step 400, the serving RAN may indicate support for assisting L1 unicast-based SL, e.g. by using an indication message. The device 120 may use this for the determination step 302. The indication serves to tell the receiving UE whether the serving cell may provide support for L1 unicast-based SL or not, so that the UE may initially decide to request for the support (i.e., ask for SL resource allocation in step 404 as explained later). The indication may not necessarily mean that the serving cell will be able to assist a particular UE and therefore the UE needs to request for assistance from the serving cell, e.g. in order to allocate the radio resources and ID(s).

In an embodiment, the support indication is cell-specific. It should be noted that not all cells of the RAN are necessarily supporting the L1 unicast-based SL even if some cells are. In an embodiment, the indication is carried over system information block (SIB). Alternatively, the indication may be UE-specific and configured to the UE 120 in a dedicated signalling. In an embodiment, the support indication of step 400 may include a binary indication where e.g. bit '0' means the RAN/cell does not support L1 unicast-based SL connection while a bit '1' the RAN/cell supports L1 unicast-based SL connection, or vice versa.

In an embodiment, the support indication of step 400 may include a resource pool. The resource pool may in an embodiment be intended for all unicast SL communications and not specific to any-one particular UE. The resource pool may be used by the UE if using L1 broadcast-based SL or UE autonomous resource allocation/selection mode. The resource pool may be provided along with constraints, such as maximum number of unicast SLs per one D2D communication session. The indication may also comprise an indication of extended support, such as an indication for scheduling for intra-cell L1 unicast-based SL when both UEs 120, 122 of the unicast SL connection are served by the cell. The indication may also specify further criteria/conditions/constraints such as what kinds of applications or services, UE categories, radio conditions, and so forth that relevant UE needs to fulfil before requesting for assistance in step 404.

The device 120 then proceeds with step 300, i.e. determining whether the application in question needs the unicast SL connection or not. Here it is assumed that the application needs such unicast SL connection.

In an optional step 402, the first and second devices 120, 122 may exchange basic safety messages (BSM), such as Cooperative Awareness Message (CAM) and/or Decentralized Environmental Notification Message (DENM). The UE 120 may determine, based on reception of BSM, the one or more UEs 122 in proximity that may be impacted with by the triggering of the application and therefore need to get involved in the D2D session to be set up for the application. The need for this step 402 may depend on the application. For example, in lane-switching scenario all the impacted vehicles could be identified in advance and be enforced to get involved, whereas for the see-through application (i.e. an application requiring see-through) one or more UEs may be capable and by default willing to get involved to provide the initiator 120 with see-though contents.

Upon/after determining that the RAN serving the first device 120 is able to assist in setting up the L1 unicast SL connection, the device 120 may in step 404 send an assistance request message to the RAN serving the first device 120. The request can be for one or more L1 unicast-based SL to be set up, as indicated in the request. It should be noted that even if the serving RAN 110 has indicated support in step 400, the serving RAN may be unable to assist at that particular time and/or for that particular UE 120. Therefore, the assistance request message of step 404 may be needed.

The assistance request message may comprise a request for a radio resource allocation for SL communication of the first device on the L1 unicast-based SL connection. In an embodiment, the request may additionally or alternatively be for at least one locally unique ID (e.g. L1 SL ID), such as a radio network temporary identifier (RNTI), to be applied for the L1 unicast-based SL connection on at least the SL radio resources (requested or received earlier in step 400). In case of RNTI, the RNTI may be referred to as L1 SL-RNTI. Other IDs than RNTI may be applicable too and RNTI is used in the following description only as an example. The at least one locally unique ID may be a locally unique ID for the at least one SL and/or locally unique IDs for the UE 120 and of the UE 122.

In step 406, the UE 120 may receive a response from the RAN. The response may comprise the requested resource allocation for the L1 unicast-based SL connection from the RAN serving the first device 120. This resource pool may be dedicated to the requesting UE's use and/or to the specific SL. However, receiving these dedicated resources may be optional, e.g. when a resource pool is indicated in step 400 and the UE autonomous resource allocation is to be used. The received response may comprise the at least one L1 SL ID (such as the RNTI) to be used on the SL resources. In case the RAN 110 is not able to assist, the response may comprise an indication that the requested network assistance for the time being cannot be provided. However, let us here assume that the assistance is possible.

The process may then proceed to step 408 where the UE 120 may determine that the L1 unicast-based SL can be provided and enforced. Consequently, the UE 120 may in step 410 send an establishment request of the L1 unicast-based SL connection (i.e. a D2D unicast connection establishment request) to one or more targeted UE 122. The establishment request may be sent over L1 broadcast-based SL on local cell-specific SL resources, because the L1 unicast-based SL connection is not yet set up by the second device 122. The request may target an individual UE 122 or one more UEs. In an embodiment, the establishment request may also comprise an identifier (e.g. a global cell ID) of the RAN serving the first device 120.

In one embodiment, the establishment request may include an indication indicating the initial determination of the initiator UE 120 regarding whether the initiator UE 120 is able to provide and enforce the L1 unicast-based SL or not ('yes', in this example of FIG. 4). In this case ('yes'), the establishment request may comprise the at least one RNTI for the L1 unicast-based SL connection and a resource allocation for the SL communication of the first device 120 on the L1 unicast-based SL connection corresponding to the at least one RNTI. That is, the L1 SL-RNTI is valid and locally unique on at least the allocated resources. In case the UE 120 has received a set of RNTIs to be used for a set of SL connections, the UE 120 may select one which is to be used in the SL connection with this particular UE 122 and provide those (RNTI and corresponding radio resources, e.g. time and frequency resources) to the UE 122.

In step 412 the first UE 120 may receive an establishment response (i.e. D2D unicast connection establishment response) from the second device 122. This response may be an acknowledgement for the unicast SL connection based on the L1 unicast-based SL.

After this response, the UEs 120, 122 (or 120 and one or more UEs 122 affected by the application run in the device 120) may in step 414 determine proceed with unicast communication session utilizing L1 unicast-based SL connection assisted by the serving RAN of the first device 120.

The D2D unicast connection establishment response in step 412 may further indicate whether the second UE is out-of-coverage (OoC) or in-coverage. The response may (in case of in-coverage) indicate whether the second device 122 is served by the same RAN as the first device 120 or not (e.g. by indicating an ID (e.g. global cell ID) of the serving RAN of the second device 122). In case the second device 122 is served by the same RAN as the first device 120 (as indicated by the determination steps of 416A and 416B), then the serving RAN may be able to provide more extended assistance. For example, the RAN may allocate the SL resources using a corresponding SL-RNTI for the L1 unicast-based SL connection via PDCCH. In this case scheduling assignment may not be needed for the SL data transmission.

In one embodiment related to the case that both UEs 120, 122 are served by the same RAN as depicted in FIGS. 4 (and FIG. 1A), the UE 120 may in step 418B send to the RAN 110 information about the L1 unicast-based SL connection. The information may identify the second device 122. From this the RAN may detect that the UE 122 is also served by the same RAN as the UE 120, and optionally provide the above mentioned extended assistance. The indication 418B may also indicate any unused L1 SL-RNTIs out of the allocated set of L1 SL-RNTIs received in step 406. The second device 122 may likewise send information about the L1 unicast-based SL connection to the RAN 110 in step 418A.

Let us then look at FIG. 5. FIG. 5 depicts a case in which the initiator UE 120 is Out-of-Coverage (OoC) and the involved UE 122 is able to provide and enforce a L1 unicast-based SL to serve as the unicast connection between the two UEs 120, 122.

In step 500, the serving RAN 112 (as in FIG. 1B) provides an indication of support of L1 unicast-based SL connection to the second UE 122. Here the contents and particulars of this indication message may be the same as that of the indication message described in connection of step 400 of FIG. 4.

Then the first UE 120 may perform the step 300 and also possibly exchange BSM(s) with the second UE 122. Step 502 may be the same as the step 402 of FIG. 4.

Because the UE 120 is out of coverage or at least partly because the UE 120 has not received any indication of support of L1 unicast-based SL from its own serving RAN (possibly e.g. RAN 110 of FIG. 1B), the UE 120 may in step 504 perform sensing and/or D2D resource reservation for the D2D session to be set up. This step may be preceded by determining the radio resources needed for the D2D session. The resource reservation may depend on whether the resources are allocated by the serving RAN or selected by the UE autonomously. Both may be applied for L1 unicast-based SL and L1 broadcast-based SL, even though network-scheduled resource allocation is more likely for L1 unicast-based SL and the autonomous UE resource selection is more likely for L1 broadcast-based SL. The reserving of the radio resources may thus be done proactively and upon initial determination which of either L1 unicast SL or L1 broadcast SL is applied, before the unicast D2D communication is actually set up. E.g. in this case of FIG. 5, the reserved resource may be on the L1 broadcast-based SL connection. E.g. when the UE 120 is OoC, then from the UE's perspective SL may by default rely on L1 broadcast-based SL using preconfigured resources. That is, the UE may be preconfigured with a resource pool for OoC situation and once the UE is OoC and needs to transmit on SL, the UE may perform sensing on the preconfigured pool for OoC and based on that select resources from the pool for the needed SL transmission. The UE may rely on preconfigured pool for OoC operation, e.g. the resource pool may be part of subscription profile configuration and/or received earlier when the UE was in-coverage. This step enables actual unicast D2D communication to take place as soon as possible and hence speed up the D2D communication session.

In step 506, the UE 120 may upon determining that the UE 120 is out of coverage or the RAN serving the first device 120 is unable to assist, request (e.g. in a D2D unicast connection establishment request) from the second device 122 establishment of the unicast SL connection. In one embodiment the request does not specify which type of unicast connection to set-up (L1 unicast-based or L1 broadcast-based). However, in one embodiment, the request may specify to set up the L1 broadcast-based SL connection as the UE 120 is not aware of any possibility to set up the L1 unicast-based SL. The establishment request may be sent over L1 broadcast-based SL on resources selected by the UE 120 from the preconfigured resource pool for OoC operation. E.g. for the needed unicast SL communication, the UE 120, even as the receiving end in some use cases, may select/reserve resources from the preconfigured pool for the OoC and indicate those to the intended peer UE 122. The request may target an individual UE 122 or one more UEs.

In one embodiment, the establishment request may include an indication indicating the initial determination of the initiator UE 120 regarding whether the initiator UE 120 is able to provide and enforce the L1 unicast-based SL or not ('no', in this example of FIG. 5). In this case ('no'), the D2D unicast connection establishment request may comprise an indication that the initiator UE 120 is out of coverage or that the current serving RAN 110 of the initiator UE 120 is not able to provide needed network assistance (e.g. the UE may be in-coverage but the RAN 110 cannot assist for the time being).

In an embodiment, the request may comprise an identifier (e.g. global cell ID) of the radio access network serving the first device 120, in case the UE 120 is aware of such.

In an embodiment, the establishment request may also comprise an indication of the reserved SL resources, but without any L1 SL-RNTI (as such has not been received by the UE for the SL communication) for expediting the D2D communication session. The indicated SL resources may, as said above, be proactively reserved by the initiator UE 120 either autonomously or allocated by the serving RAN (e.g. earlier) so that those can be used to transmit/receive SL to/from the initiator UE 120.

In an embodiment, the request comprises information needed by the second device 122 to request resources from the RAN 112 serving the second device 122. The information may in an embodiment be derivable from the requested application/service. E.g. the involved UE 112 may determine the needed resources, especially in case the involved UE 112 is actually the content provider (e.g. in case of see-though). However, in an embodiment, the information may comprise at least one of the following: QoS requirements, preferable QoS constraints or priorities, expected session lifetime, amount of data to be communicated over SL (e.g. when the requesting UE needs to transmit), indication of whether the session may involve other UEs and corresponding SLs.

The second UE 122, after having received the support indication in step 500 and having detected that the first UE 120 is not being assisted by the serving RAN, may in step 508 determine that L1 unicast-based SL may be an option. Therefore, the UE 122 may in step 510 send an assistance request message to the RAN 112 serving the second device 122. The request can be for one or more L1 unicast-based SL to be set up. The assistance request message may further comprise a request for a radio resource allocation for SL communication of the second device on the L1 unicast-based SL connection. The request may alternatively or additionally be for at least one locally unique ID, such as a radio network temporary identifier (RNTI) to be applied for the L1 unicast-based SL connection on at least the SL radio resources (requested or received earlier in step 500). This RNTI may be referred to as L1 SL-RNTI. Other IDs than RNTI may be applicable too and RNTI is used as one example. The locally unique ID may be a locally unique ID for the at least one SL and/or locally unique IDs for the UE 120 and of the UE 122.

In step 512, the UE 122 may receive a response from the RAN 112. The response may include the requested resource allocation for the L1 unicast-based SL connection from the RAN serving the second device 122. This resource pool may be dedicated to the requesting UE's use and/or to the specific SL. However, receiving these dedicated resources may be optional, e.g. when a resource pool is indicated in step 400 and the UE autonomous resource allocation is to be used. The received response may comprise the at least one L1 SL ID (such as the RNTI) to be used on the SL resources. In case the RAN 112 is not able to assist, the response may comprise an indication that the requested network assistance for the time being cannot be provided. However, let us here assume that the assistance is possible. As a result, the UE 122 may determine in step 514 that the L1 unicast-based SL is enforced and to be applied.

Thereafter, the UE 122 may in step 516 send a D2D unicast connection establishment response to the UE 120. The response may include an indication that the responding UE 122 is able to provide and enforce L1 unicast-based SL.

In one embodiment the RAN 112 may indicate to the requesting UE 122 a set of L1 SL IDs e.g. in the response of step 512. The UE 122 may indicate these to the initiator UE 120 who can then use those for setting up plurality of SL connections with a plurality of involved UEs. In addition to the L1 SL IDs, also dedicated resource pools for the plurality of SLs may be provided by the RAN 112 to the UE 122 for forwarding to the UE 120, or one resource pool from which the UE 120 may select appropriate among for each of the plurality of SLs. This may be beneficial for supporting critical application such as the lane-merging/switching which may enforce all the impacts UEs to get involved with the best possible capability and capacity and prefer to use L1 unicast-based SL whenever possible.

The D2D unicast connection establishment response may further comprise an indication of a cell ID (e.g. global cell ID) of the serving RAN 112 of the responding UE 122, and/or the resource allocation received from the RAN 112, and/or the locally unique ID, such as the L1 SL-RNTI, corresponding to the resource allocation.

After this response, the UEs 120, 122 (or 120 and one or more UEs 122 affected by the application run in the device 120) may in step 518 determine to proceed with the unicast communication session utilizing L1 unicast-based SL connection assisted by the serving RAN 112 of the second device 122, instead of the L1 broadcast-based SL connection.

A step corresponding to step 418A may exist also in the example embodiment of FIG. 5. That is, the UE 122 may inform the serving RAN information regarding the applied L1 unicast-based SL connection taking place between the UEs 120 and 122. The information may identify the first device 120 (i.e. the peer UE of the SL). The indication may also indicate any unused L1 SL-RNTIs out of the allocated set of L1 SL-RNTIs possibly received in step 512.

FIG. 6 then depicts a case in which both the initiator UE 120 and the involved UE 122 are Out-of-Coverage. In step 602, the devices 120, 122 may optionally exchange basic safety messages, as explained already in connection of step

402. After step 300, the UE 120 may decide that D2D unicast is needed for this application.

Because the UE 120 has not received any indication of support of L1 unicast-based SL from its own serving RAN (possibly because of OoC situation), the UE 120 may in step 604 perform sensing and D2D resource reservation for the D2D session to be set up. This step may be similar to that of step 504.

After this, the UE 120 (initiator UE) may send establishment of the unicast SL connection in step 606 to the second UE 122. This step is the same as that of step 506 of FIG. 5. In step 608, the second UE 122 after having detected that the second UE cannot receive assistance from its serving cell (e.g. out-of-coverage and/or the RAN 110/112 being unable to assist for the time being), the second UE 122 sends a response to the first UE. The response may include an indication that the second UE 122 is not able to provide and enforce the L1 unicast-based SL. E.g. the response may comprise an indication that the involved UE 122 is out-of-coverage or that the current serving RAN 110/112 of the UE 122 is not able to provide needed network assistance (e.g. the UE may be in-coverage but RAN cannot assist for the time being).

Based on this, the UE 120 decides to proceed with unicast SL connection assisted by the L1 broadcast-based SL, instead of being assisted by L1 unicast-based SL as in FIGS. 4 and 5. The L1 broadcast-based SL used in this example embodiment of FIG. 6 here means that no RNTI (or similar) ID on the AS layer is being used. On the contrary, an upper layer identifier, such as L2 destination ID, is applied and the required unicast SL connection may be established via higher layer signaling above AS layer (e.g. NAS signaling), as explained earlier in connection of step 304B.

In this way, in all the example embodiments presented in connection of FIGS. 4-6, the UEs may communicate over unicast SL connection which is beneficial for the low latency and high reliability requiring applications.

It may be noted that in the see-through application used as one example application, the initiator UE 120 is the one which needs to receive contents (e.g. see-though assisting video streams) from one or more UEs 122 in front of the initiator UE 120. Thus, in an embodiment, the setup of unicast SL connection is a receiver-initiated process.

In one embodiment where both the initiator UE 120 and the involved UE 122 share the same serving RAN/cell, C-RNTIs of the UEs can be utilized for the SL, instead of or in addition to L1 SL ID (such as the L1 SL-RNTI). For this, D2D unicast connection establishment request 410 and D2D unicast connection establishment response 412 may optionally indicate the cellular RNTI (C-RNTI) of the UEs 120, 122.

In an embodiment where the initiator UE 120 does not determine the involved UE(s) 122 beforehand, the initiator UE 120 may use any suitable UE 122 in proximity which responds to the initiator's request. In this case, there may be a need for a third D2D message by the UE 120 to the responding UE 122, in addition to D2D unicast connection establishment request and D2D unicast connection establishment response, to indicate the SL resource allocation (including the L1 SL ID), in order to set up the L1 unicast-based SL. These D2D messages may be implemented as D2D application control messages or control plane SL control messages, if the control plane is introduced to the SL. Otherwise, MAC CE based SL control signaling may be used as another option.

Some of the embodiments presented may help to speed up the unicast connection setup for the use cases of interest.

Some of the embodiments presented may help to resolve L1 ID issue. For example, regarding security, a permanent Global UE ID should preferably not be disclosed in L1 signaling or, that is, current L1 signaling is not highly protected in term of security and therefore sending a permanent Global UE ID in L1 signaling is not preferable. Furthermore, L1 signaling or physical SL control channel (PSCCH) used to schedule for a radio transmission over SL is rather limited in the maximum number of bits and therefore using a long global UE ID on PSCCH is not preferable. The solution may allow unicast D2D using L1 unicast-based SL whenever possible and otherwise using L1 broadcast-based SL where unicast connection is realized on higher layer using existing higher-layer UE IDs.

Although the description is written partly so that the UE 120 is to set up one SL with the UE 122, the UE 120 may decide to set up multiple SLs with multiple second UEs 122, depending on the need of the application in question.

Although the description in some instances refers to the UE 120 and the one or more UEs 122 being vehicular devices, the UEs 120, 122 need not necessarily be vehicular devices and the proposal is valid for any devices/UEs. However, in one embodiment, the device 120, 122 are vehicular devices, such as autos or motorcycles.

From the point of view of the second device 122, the proposal may comprise e.g. receiving a request for unicast connection establishment (i.e. the D2D unicast connection establishment request explained above) from the first device 120. In one embodiment, the establishment request may be sent over L1 broadcast-based SL. In an embodiment, the establishment request may also comprise an identifier (e.g. a global cell ID) of the RAN serving the first device 120. In one embodiment, the establishment request may include an indication indicating whether the initiator UE 120 is able to provide and enforce the L1 unicast-based SL or not.

In case of ('yes'), the establishment request may comprise at least one RNTI for the L1 unicast-based SL connection and a resource allocation for the SL communication of the first device 120 on the L1 unicast-based SL connection corresponding to the at least one RNTI. That is, the L1 SL-RNTI is valid and locally unique on at least the allocated resources. Then the UE 122 may respond to the request by sending the D2D unicast connection establishment response. The response may in an embodiment indicate whether the second UE is out-of-coverage (OoC) or in-coverage. The response may further (in case of in-coverage) indicate whether the second device 122 is served by the same RAN as the first device 120 or not (e.g. by indicating an ID (e.g. global cell ID) of the serving RAN of the second device 122). In this case, the second UE 122 may proceed with unicast SL connection by applying the L1 unicast-based SL assisted by the RAN of the first UE 120.

In case of ('no'), and after having determined that the RAN of the second UE is able to assist setting up the unicast SL connection based on L1 unicast-based SL, the second UE may send an assistance request message to the RAN 112 serving the second device 122, as explained in step 510. The request can be for one or more L1 unicast-based SL to be set up. The assistance request message may further comprise a request for a radio resource allocation for SL communication of the second device on the L1 unicast-based SL connection. The request may alternatively or additionally be for at least one locally unique ID, such as a radio network temporary identifier (RNTI) to be applied for the L1 unicast-based SL connection on at least the SL radio resources (requested or received earlier in step 500). This RNTI may be referred to as L1 SL-RNTI. Other IDs than RNTI may be applicable too and RNTI is used as one example. Said more generally, the locally unique ID may be a locally unique ID for the at least one SL and/or locally unique IDs for the UE 120 and of the UE 122. Then, the UE 122 may receive a response from the RAN 112. The response may include the requested resource allocation for the L1 unicast-based SL connection from the RAN serving the second device 122. This resource pool may be dedicated to the requesting UE's use and/or to the specific SL. However, receiving these dedicated resources may be optional, e.g. when a resource pool is indicated in step 500 and the UE autonomous resource allocation is to be used. The received response may comprise the at least one L1 SL ID (such as the RNTI) to be used on the SL resources. From the RAN response, the UE 122 may determine in step 514 that the L1 unicast-based SL is enforced and to be applied. Thereafter, the UE 122 may send a D2D unicast connection establishment response to the UE 120. The D2D unicast connection establishment may include an indication that the responding UE 122 is able to provide and enforce L1 unicast-based SL. The D2D unicast connection establishment may further comprise an indication of at least one of the following: a cell ID (e.g. global cell ID) of the serving RAN 112 of the responding UE 122, a L1 SL-RNTI received and radio resources on which L1 SL-RNTI is locally unique. In this case, the second UE 122 may proceed with unicast SL connection by applying the L1 unicast-based SL assisted by the RAN of the second UE 122.

In case of 'no' and having detected that the RAN serving the second UE 122 is also unable to assist in setting up the L1 unicast-based SL connection, the second UE 122 may respond to first UE with an indication that the second UE 122 is not able to provide and enforce the L1 unicast-based SL. In this case, the second 122 may proceed with unicast SL connection by applying the L1 broadcast-based SL.

From the point of view of the radio access network (or a control node 110/112 of the serving RAN), the proposal may comprise e.g. providing an indication to a device 120, 122, wherein the indication indicates that the RAN supports the device to set up a unicast SL connection based on a L1 unicast-based SL connection. The proposal may further comprise the control node of the RAN receiving, from the device, a request for assistance in setting up the unicast SL connection with another device. In one embodiment, the request may comprise a request for a radio resource allocation for the SL communication of the device on the L1 unicast-based SL connection. In one embodiment, the request may further be for at least one radio network temporary identifier (RNTI) to be applied as a locally unique ID for the L1 unicast-based SL connection on at least the requested radio resources. This RNTI may be referred to as L1 SL-RNTI. Other IDs than RNTI may be applicable too and RNTI is used as one example. The locally unique ID may be a locally unique ID for the at least one SL and/or locally unique IDs for the devices participating in the SL. Then, in response to receiving the request, the control node of the RAN may provide to the requesting device at least a resource allocation for the L1 unicast-based SL connection. In one embodiment, the provided resource allocation may further include the at least one RNTI to be used on the allocated resources. In one embodiment, in case the RAN serves both of the UEs involved in the SL communication, the control node of the RAN may allocate the resources by using the corresponding L1 SL-RNTI for the L1 unicast-based SL connection via a PDCCH.

Figure 7:
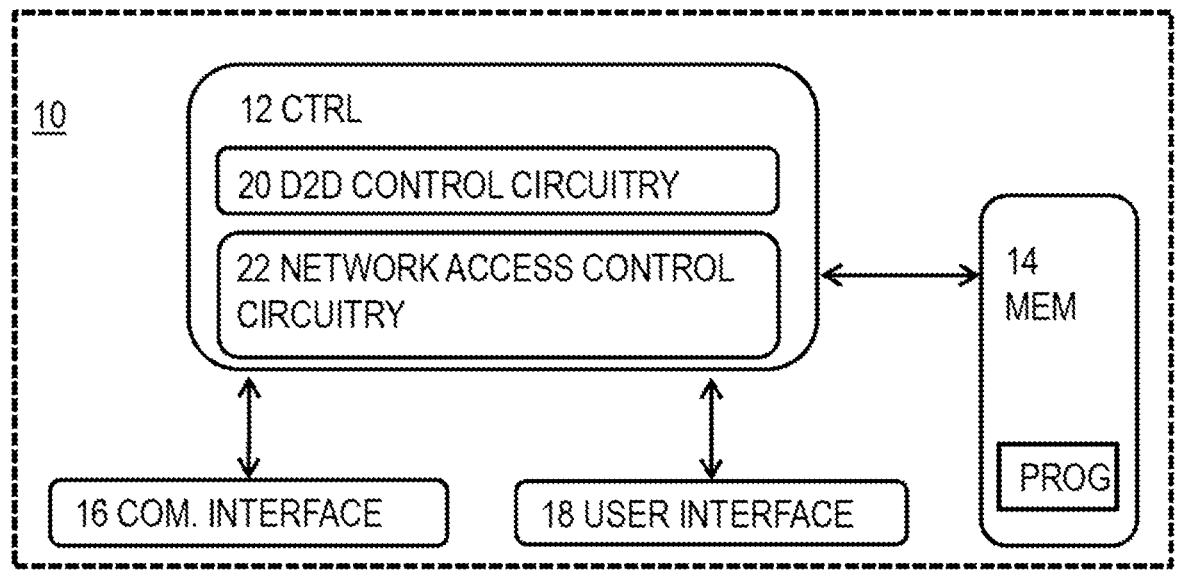
FIG. 7 depicts an apparatus, according to some embodiments.

An embodiment, as shown in FIG. 7, provides an apparatus 10 comprising a control circuitry (CTRL) 12, such as at least one processor, and at least one memory 14 including a computer program code (PROG), wherein the at least one memory and the computer program code (PROG), are configured, with the at least one processor, to cause the apparatus to carry out any one of the above-described processes. The memory may be implemented using any suitable data storage technology, such as semiconductor-based memory devices, flash memory, magnetic memory devices and systems, optical memory devices and systems, fixed memory and removable memory.

In an embodiment, the apparatus 10 may comprise the terminal device of a communication system, e.g. a user terminal (UT), a computer (PC), a laptop, a tabloid computer, a cellular phone, a mobile phone, a communicator, a smart phone, a palm computer, a mobile transportation apparatus (such as a car), a household appliance, a device, or any other communication apparatus, commonly called as UE or device in the description. Alternatively, the apparatus is comprised in such a terminal device. Further, the apparatus may be or comprise a module (to be attached to the UE) providing connectivity, such as a plug-in unit, an "USB dongle", or any other kind of unit. The unit may be installed either inside the UE or attached to the UE with a connector or even wirelessly. In an embodiment, the apparatus may be comprised or comprise the first device 120. In an embodiment, the apparatus may be comprised or comprise the second device 122.

The apparatus may further comprise communication interface (TRX) 16 comprising hardware and/or software for realizing communication connectivity according to one or more communication protocols. The TRX may provide the apparatus with communication capabilities to access the radio access network, for example. The apparatus may also comprise a user interface 18 comprising, for example, at least one keypad, a microphone, a touch display, a display, a speaker, etc. The user interface may be used to control the apparatus by the user.

The control circuitry 12 may comprise a D2D access control circuitry 20 for controlling access and use of resources on a D2D link, for determining whether to apply L1 unicast-based SL or L1 broadcast-based SL for the unicast connection. according to any of the embodiments. The control circuitry 12 may comprise a network access control circuitry 22 e.g. accessing and communicating with a network, such as cellular radio access network, according to any of the embodiments.

Figure 8:
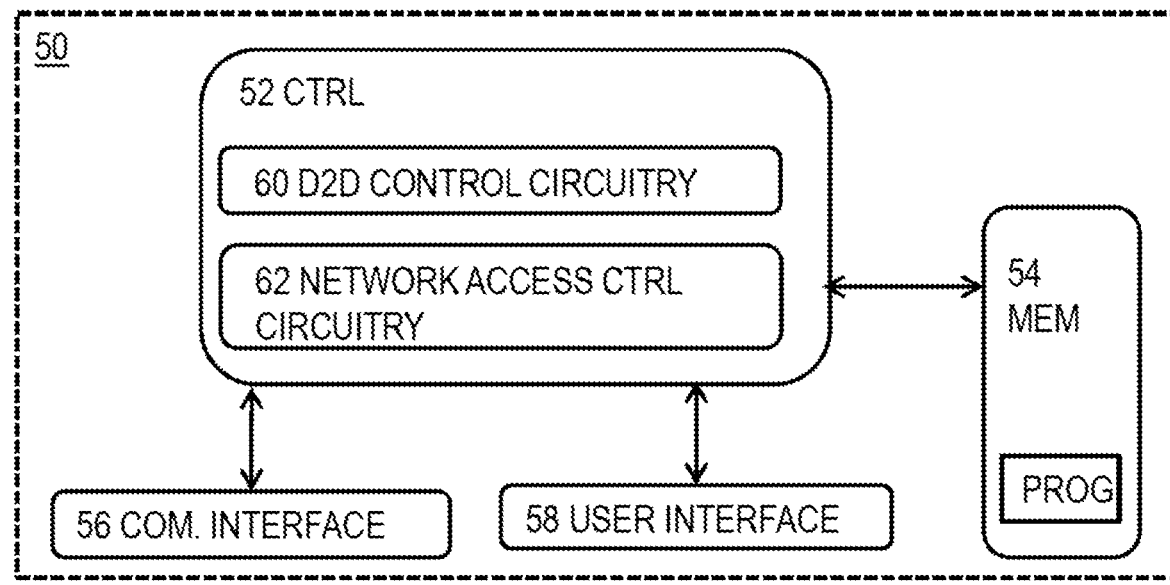
FIG. 8 depicts an apparatus, according to some embodiments.

An embodiment, as shown in FIG. 8, provides an apparatus 50 comprising a control circuitry (CTRL) 52, such as at least one processor, and at least one memory 54 including a computer program code (PROG), wherein the at least one memory and the computer program code (PROG), are configured, with the at least one processor, to cause the apparatus to carry out any one of the above-described processes. The memory may be implemented using any suitable data storage technology, such as semiconductor-based memory devices, flash memory, magnetic memory devices and systems, optical memory devices and systems, fixed memory and removable memory.

In an embodiment, the apparatus 10 may be or be comprised in a network node of the radio access network, such as in gNB/gNB-CU/gNB-DU of 5G or in eNB/eNB-CU/eNB-DU of EUTRA. In an embodiment, the apparatus 10 is or is comprised in the network node 110 or 112.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation.

In an embodiment, the server may generate a virtual network through which the server communicates with the radio node. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the apparatus 50 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the radio node may be stand-alone apparatuses communicating with each other via a radio path or via a wired connection. Alternatively, they may be in a same entity communicating via a wired connection, etc. The edge cloud or edge cloud server may serve a plurality of radio nodes or a radio access networks. In an embodiment, at least some of the described processes may be performed by the central unit. In another embodiment, the apparatus 50 may be instead comprised in the distributed unit, and at least some of the described processes may be performed by the distributed unit.

In an embodiment, the execution of at least some of the functionalities of the apparatus 50 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the apparatus 10 controls the execution of the processes, regardless of the location of the apparatus and regardless of where the processes/functions are carried out.

The apparatus may further comprise communication interface (TRX) 56 comprising hardware and/or software for realizing communication connectivity according to one or more communication protocols. The TRX may provide the apparatus with communication capabilities to access the radio access network, for example. The apparatus may also comprise a user interface 58 comprising, for example, at least one keypad, a microphone, a touch display, a display, a speaker, etc. The user interface may be used to control the apparatus by the user.

The control circuitry 52 may comprise an D2D control circuitry 60 for controlling D2D related aspects, such as resource allocation, ID allocation, or setting-up of the L1 unicast-based SL, according to any of the embodiments. The control circuitry 52 may comprise a network access control circuitry 62 for controlling mobile access to the network via the apparatus 50.

In an embodiment, an apparatus carrying out at least some of the embodiments described comprises at least one processor and at least one memory including a computer program code, wherein the at least one memory and the computer program code are configured, with the at least one processor, to cause the apparatus to carry out the functionalities according to any one of the embodiments described. According to an aspect, when the at least one processor executes the computer program code, the computer program code causes the apparatus to carry out the functionalities according to any one of the embodiments described. According to another embodiment, the apparatus carrying out at least some of the embodiments comprises the at least one processor and at least one memory including a computer program code, wherein the at least one processor and the computer program code perform at least some of the functionalities according to any one of the embodiments described. Accordingly, the at least one processor, the memory, and the computer program code form processing means for carrying out at least some of the embodiments described. According to yet another embodiment, the apparatus carrying out at least some of the embodiments comprises a circuitry including at least one processor and at least one memory including computer program code. When activated, the circuitry causes the apparatus to perform the at least some of the functionalities according to any one of the embodiments described.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Following is a list of some aspects of the invention.

According to a first aspect, there is provided a method at a first user equipment, the method comprising: deciding to set up a unicast sidelink, SL, connection with a second user equipment; determining whether or not a radio access network serving the first user equipment or a radio access network serving the second user equipment is able to assist in setting up the unicast SL connection; performing one of the following: upon determining the positive, applying a L1 unicast-based SL connection for setting up the unicast SL connection, upon determining the negative, applying a L1 broadcast-based SL connection for setting up the unicast SL connection; and communicating with the second user equipment over the unicast SL.

Various embodiments of the first aspect may comprise at least one feature from the following bulleted list:

determining an application requesting the connection; and performing the deciding based on the application.

wherein the application requires the unicast SL connection if the application is triggered by the first user equipment for assistance in at least partly autonomous driving.

wherein the application requires the unicast SL connection if the application is at least one of a group comprising: a see-through application and a line-switching application.

wherein the application requires the unicast SL connection if the application is at least one of a group comprising: a see-through application and a line-switching application.

wherein the determining comprises receiving, from the radio access network serving the first vehicular user equipment, an indication of a support for setting up the L1 unicast-based SL connection.

determining that the radio access network serving the first user equipment is able to assist in setting up the L1 unicast SL connection; requesting from the radio access network serving the first user equipment at least one locally unique identifier to be applied for the L1 unicast-based SL connection; and receiving the at least one locally unique identifier from the radio access network serving the first user equipment.

determining that the radio access network serving the first user equipment is able to assist in setting up the L1 unicast SL connection; requesting from the radio access network serving the first user equipment at least one locally unique identifier to be applied for the L1 unicast-based SL connection; and receiving the at least one locally unique identifier from the radio access network serving the first user equipment.

requesting from the radio access network serving the first user equipment a resource allocation for the L1 unicast-based SL connection; and receiving the resource allocation for the L1 unicast-based SL connection from the radio access network serving the first user equipment.

determining that the radio access network serving the first user equipment is able to assist in setting up the L1 unicast SL connection; sending to the second user equipment, an establishment request for the L1 unicast-based SL connection; and communicating with the second user equipment over the L1 unicast-based SL connection.

wherein the establishment request comprises at least one locally unique identifier for the L1 unicast-based SL connection and a resource allocation for the L1 unicast-based SL connection corresponding to the at least one locally unique ID.

receiving an establishment response from the second user equipment; determining from the establishment response that the second user equipment is served by the same radio access network as the first user equipment; and sending, to the radio access network serving the first user equipment, an indication of the identity of the second user equipment.

determining that the radio access network serving the first user equipment is unable to assist; and sending to the second user equipment, an establishment request for the unicast SL connection.

proactively reserving resources for the unicast SL connection before the SL connection is set up; and including an indication of the resources in the establishment request.

receiving an establishment response from the second user equipment indicating that the radio access network of the second user equipment is able to assist in setting up the L1 unicast-based SL connection, wherein the establishment response includes at least one locally unique identifier to be applied for the L1 unicast-based SL connection; and communicating with the second user equipment over the L1 unicast-based SL connection, instead of the L1 broadcast-based SL connection.

According to a second aspect, there is provided an apparatus, comprising: at least one processor and at least one memory including a computer program code, wherein the at least one memory and the computer program code are configured, with the at least one processor, to cause a first user equipment to perform operations comprising: deciding to set up a unicast sidelink, SL, connection with a second user equipment; determining whether or not a radio access network serving the first user equipment or a radio access network serving the second user equipment is able to assist in setting up the unicast SL connection; performing one of the following: upon determining the positive, applying a L1 unicast-based SL connection for setting up the unicast SL connection, upon determining the negative, applying a L1 broadcast-based SL connection for setting up the unicast SL connection; and communicating with the second user equipment over the unicast SL.

Various embodiments of the second aspect may comprise at least one feature from the bulleted list under the first aspect.

According to a third aspect, there is provided a computer program product embodied on a distribution medium readable by a computer and comprising program instructions which, when loaded into an apparatus, execute the method according to the first aspect. Various embodiments of the third aspect may comprise at least one feature from the bulleted list under the first aspect.

According to a fourth aspect, there is provided a computer program product comprising program instructions which, when loaded into an apparatus, execute the method according to the first aspect. Various embodiments of the fourth aspect may comprise at least one feature from the bulleted list under the first aspect.

According to a fifth aspect, there is provided an apparatus, comprising means for performing the method according to the first aspect, and/or means configured to cause the first user equipment to perform the method according to the first aspect. Various embodiments of the fifth aspect may comprise at least one feature from the bulleted list under the first aspect.

According to a sixth aspect, there is provided an apparatus, comprising at least one processor and at least one memory including a computer program code, wherein the at least one memory and the computer program code are configured, with the at least one processor, to cause a second user equipment to perform operations comprising: receiving an establishment request for a unicast sidelink, SL, connection establishment from the first user equipment, the request indicating whether the first user equipment is able to enforce a L1 unicast-based SL connection or not; upon detecting that the first user equipment is able to enforce the L1 unicast-based SL connection, performing the following: extracting from the establishment request at least one locally unique identifier for the L1 unicast-based SL connection and a resource allocation for the SL communication corresponding to the at least one locally unique identifier, and communicating with the first user equipment over the L1 unicast-based SL connection; upon detecting that the first user equipment is not able to enforce the L1 unicast-based SL connection, performing the following: determining whether a radio access network serving the second user equipment is able to assist in setting up the L1 unicast SL connection or not; upon determining the positive, performing the following: requesting and receiving from the radio access network serving the second user equipment at least one at least one locally unique identifier for the L1 unicast-based SL connection, responding to the first user equipment, wherein the response includes the at least one locally unique identifier and a resource allocation for the SL communication corresponding to the at least one locally unique identifier, and communicating with the first user equipment over the L1 unicast-based SL connection; upon determining the negative, performing the following: communicating with the first user equipment over a L1 broadcast-based SL connection.

According to a seventh aspect, there is provided an apparatus, comprising at least one processor and at least one memory including a computer program code, wherein the at least one memory and the computer program code are configured, with the at least one processor, to cause a control node of a radio access network to perform operations comprising: providing an indication to a user equipment, wherein the indication indicates that the radio access network supports the UE to set up a unicast sidelink, SL, connection based on a L1 unicast-based SL connection; receiving, from the user equipment, a request for assistance in setting up the unicast SL connection with another user equipment, the request comprising at least a request for at least one locally unique identifier to be applied for the L1 unicast-based SL connection; and in response to receiving the request, providing to the requesting user equipment at least the at least one locally unique identifier to be applied for the L1 unicast-based SL connection.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method at a first user equipment, the method comprising:
   deciding to set up a unicast sidelink (SL) connection with a second user equipment;
   determining whether or not a radio access network serving the first user equipment or a radio access network serving the second user equipment is able to assist in setting up the unicast SL connection;
   upon determining the radio access network able to assist, applying a layer 1 (L1) unicast-based SL connection for setting up the unicast SL connection with applying L1 identifiers for the unicast SL connection;
   upon determining the radio access network not able to assist, applying a layer 1 (L1) broadcast-based SL connection for setting up the unicast SL connection without applying L1 identifiers for the unicast SL connection; and
   communicating with the second user equipment over the unicast SL.

2. The method of claim 1, further comprising:
determining an application requesting the connection; and
performing the deciding based on the application,
wherein the application requires the unicast SL connection if the application is triggered by the first user equipment for assistance in at least partly autonomous driving; and/or
wherein the application requires the unicast SL if the application is at least one of a group comprising: a see-through application and a line-switching application.

3. The method of claim 1, wherein the determining comprises receiving, from the radio access network serving the first user equipment, an indication of a support for setting up the L1 unicast-based SL connection.

4. The method of claim 1, further comprising:
determining that the radio access network serving the first user equipment is able to assist in setting up the L1 unicast SL connection;
sending to the second user equipment, an establishment request for the L1 unicast-based SL connection, wherein the establishment request comprises at least one locally unique identifier for the L1 unicast-based SL connection and a resource allocation for the L1 unicast-based SL connection corresponding to the at least one locally unique ID; and
communicating with the second user equipment over the L1 unicast-based SL connection.

5. The method of claim 4, further comprising:
receiving an establishment response from the second user equipment;
determining from the establishment response that the second user equipment is served by the radio access network serving the first user equipment; and
sending, to the radio access network serving the first user equipment, an indication of the identity of the second user equipment.

6. The method of claim 1, further comprising:
determining that the radio access network serving the first user equipment is unable to assist;
proactively reserving resources for the unicast SL connection before the SL connection is set up;
sending to the second user equipment, an establishment request for the unicast SL connection; and
including an indication of the resources in the establishment request.

7. The method of claim 6, further comprising:
receiving an establishment response from the second user equipment indicating that the radio access network of the second user equipment is able to assist in setting up the L1 unicast-based SL connection, wherein the establishment response includes at least one locally unique identifier to be applied for the L1 unicast-based SL connection; and
communicating with the second user equipment over the L1 unicast-based SL connection, instead of the L1 broadcast-based SL connection.

8. An apparatus, comprising:
at least one processor and at least one memory including a computer program code, wherein the at least one memory and the computer program code are configured, with the at least one processor, to cause a first user equipment to perform operations comprising:
deciding to set up a unicast sidelink (SL) connection with a second user equipment;
determining whether or not a radio access network serving the first user equipment or a radio access network serving the second user equipment is able to assist in setting up the unicast SL connection;
upon determining the radio access network able to assist, applying a layer 1 (L1) unicast-based SL connection for setting up the unicast SL connection with applying L1 identifiers for the unicast SL connection;
upon determining the radio access network not able to assist, applying a layer 1 (L1) broadcast-based SL connection for setting up the unicast SL connection without applying L1 identifiers for the unicast SL connection; and
communicating with the second user equipment over the unicast SL.

9. The apparatus of claim 8, wherein the at least one memory and the computer program code are configured, with the at least one processor, to cause the first user equipment to perform operations comprising:
determining an application requesting the connection; and
performing the deciding based on the application, wherein the application requires the unicast SL connection if the application is triggered by the first user equipment for assistance in at least partly autonomous driving; and/or
wherein the application requires the unicast SL connection if the application is at least one of a group comprising: a see-through application and a line-switching application.

10. The apparatus of claim 8, wherein the determining comprises receiving, from the radio access network serving the first user equipment, an indication of a support for setting up the L1 unicast-based SL connection.

11. The apparatus of claim 8, wherein the at least one memory and the computer program code are configured, with the at least one processor, to cause the first user equipment to perform operations comprising:
determining that the radio access network serving the first user equipment is able to assist in setting up the L1 unicast SL connection;
requesting from the radio access network serving the first user equipment at least one locally unique identifier to be applied for the L1 unicast-based SL connection; and
receiving the at least one locally unique identifier from the radio access network serving the first user equipment.

12. The apparatus of claim 11, wherein the at least one memory and the computer program code are configured, with the at least one processor, to cause the first user equipment to perform operations comprising:
requesting from the radio access network serving the first user equipment a resource allocation for the L1 unicast-based SL connection; and
receiving the resource allocation for the L1 unicast-based SL connection from the radio access network serving the first user equipment.

13. The apparatus of claim 8, wherein the at least one memory and the computer program code are configured, with the at least one processor, to cause the first user equipment to perform operations comprising:
determining that the radio access network serving the first user equipment is able to assist in setting up the L1 unicast SL connection;
sending to the second user equipment, an establishment request for the L1 unicast-based SL connection; and
communicating with the second user equipment over the L1 unicast-based SL connection.

14. The apparatus of claim 13, wherein the establishment request comprises at least one locally unique identifier for the L1 unicast-based SL connection and a resource allocation for the L1 unicast-based SL connection corresponding to the at least one locally unique ID.

15. The apparatus of claim 13, wherein the at least one memory and the computer program code are configured, with the at least one processor, to cause the first user equipment to perform operations comprising:
receiving an establishment response from the second user equipment;
determining from the establishment response that the second user equipment is served by the radio access network serving the first user equipment; and
sending, to the radio access network serving the first user equipment, an indication of the identity of the second user equipment.

16. The apparatus of claim 8, wherein the at least one memory and the computer program code are configured, with the at least one processor, to cause the first user equipment to perform operations comprising:
determining that the radio access network serving the first user equipment is unable to assist;
proactively reserving resources for the unicast SL connection before the SL connection is set up;
sending to the second user equipment, an establishment request for the unicast SL connection; and
including an indication of the resources in the establishment request.

17. The apparatus of claim 16, wherein the at least one memory and the computer program code are configured, with the at least one processor, to cause the first user equipment to perform operations comprising:
receiving an establishment response from the second user equipment indicating that the radio access network of the second user equipment is able to assist in setting up the L1 unicast-based SL connection, wherein the establishment response includes at least one locally unique identifier to be applied for the L1 unicast-based SL connection; and
communicating with the second user equipment over the L1 unicast-based SL connection, instead of the L1 broadcast-based SL connection.

18. The apparatus of claim 8, wherein the apparatus is or is comprised in the first user equipment.

19. The apparatus of claim 8, wherein the determining whether or not the radio access network serving the second user equipment is able to assist in setting up the unicast SL connection comprises negotiation between the first and second user equipments.

20. An apparatus, comprising at least one processor and at least one memory including a computer program code, wherein the at least one memory and the computer program code are configured, with the at least one processor, to cause a second user equipment to perform operations comprising:
receiving an establishment request for a unicast sidelink (SL) connection establishment from the first user equipment, the request indicating whether the first user equipment is able to enforce a layer 1 (L1) unicast-based SL connection or not;
upon detecting that the first user equipment is not able to enforce the L1 unicast-based SL connection,
determining whether a radio access network serving the second user equipment is able to assist in setting up the L1 unicast SL connection or not and upon determining that the radio access network serving the second user equipment is not able to assist, communicating with the first user equipment over a L1 broadcast-based SL connection without applying L1 identifiers for the unicast SL connection and upon determining that the radio access network serving the second user equipment is able to assist, communicating with the first user equipment over a L1 unicast-based SL connection with applying L1 identifiers for the unicast SL connection.

\* \* \* \* \*